Jan. 18, 1966    A. H. MÜLLER    3,229,674
ROTARY PISTON ENGINE
Filed Nov. 20, 1961
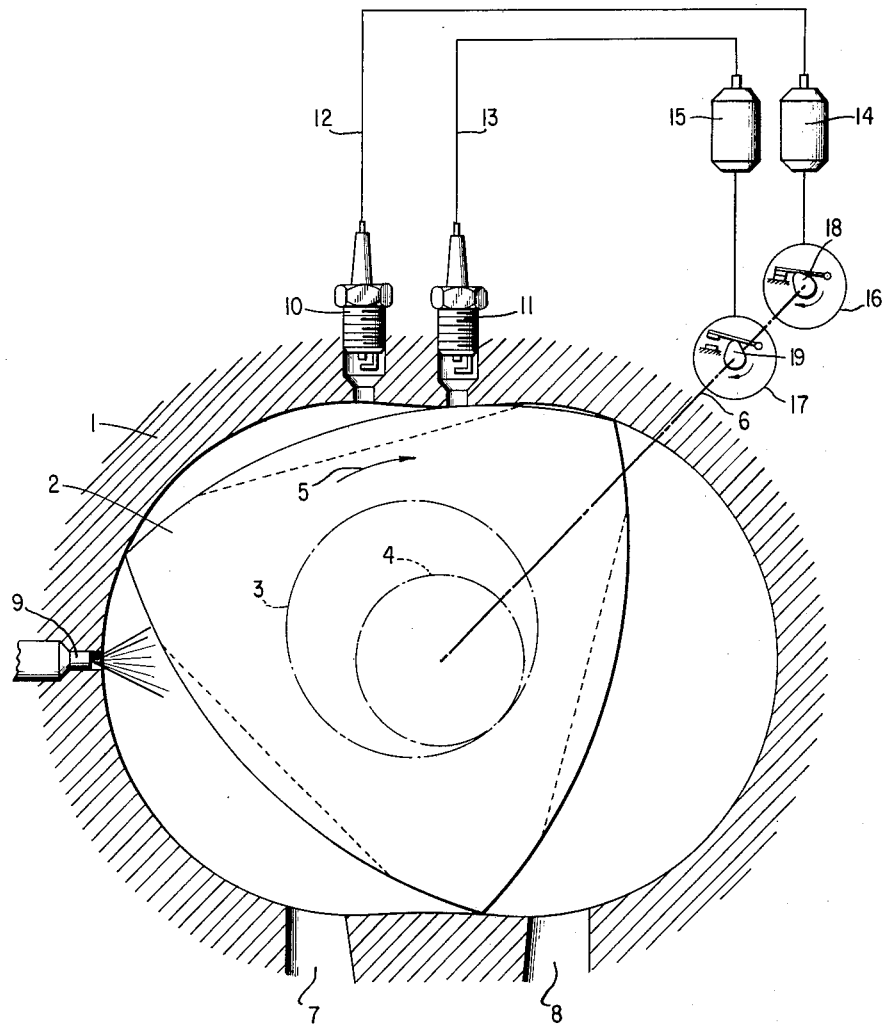
INVENTOR.
ALFRED H. MÜLLER
BY *Dicke and Craig*
ATTORNEYS.

United States Patent Office 3,229,674
Patented Jan. 18, 1966

3,229,674
ROTARY PISTON ENGINE
Alfred H. Müller, Waiblingen, Germany, assignor to Daimler-Benz Aktiengesellschaft, Stuttgart-Unterturkheim, Germany
Filed Nov. 20, 1961, Ser. No. 153,375
Claims priority, application Germany, Nov. 23, 1960, D 34,790
1 Claim. (Cl. 123—8)

The present invention relates to a rotary-piston internal combustion engine with external auto-ignition or applied ignition, especially of disk-type rotary piston construction in which the axis of rotation of the piston, in turn, carries out a rotary movement with respect to the stationary or fixed housing. Such types of engines provided, for example, with a triangularly-shaped piston and with an epitrochoid as housing form produce as a rule narrow and relatively elongated combustion spaces at the moment of the ignition. It has already been proposed for purposes of good ignition of the mixture to provide two spark plugs at different places of the combustion space.

The present invention produces a further improvement over such prior art arrangement by proposing the provision of several, especially two spark plugs with a different ignition moment. In this manner, the timely course of the combustion can be controlled accurately and the moment of ignition of the spark plug igniting in second place may be matched to the expanion velocity of the flame front.

The arrangement of spark plugs operative to ignite successively at approximately the same place of the combustion space may under certain circumstances entail advantages as compared to a simultaneous ignition because with the engines under consideration other parts of the mixture are moved continuously past the spark plugs to a much larger extent than with the usual stroke piston engines. Particularly advantageous however is understandably an arrangement in which the spark plugs are disposed one behind the other in the direction of rotation of the piston.

It is additionally proposed in connection with the structural realization of the present invention to provide interrupters adapted to be adjusted independently of one another and cooperating, respectively, with an ignition coil and a spark plug each which interrupters are directly driven by the drive shaft of the engine transmitting the circular movement of the piston-rotary axis.

Accordingly, it is an object of the present invention to provide a rotary piston internal combustion engine which eliminates in a simple and effective manner the shortcomings and inadequacies encountered with the prior art constructions.

It is another object of the present invention to provide a rotary piston internal combustion engine of the type provided with applied external ignition for igniting the combustion mixture present in the combustion space which effectively compensates for relatively narrow and relatively elongated combustion spaces.

Still another object of the present invention resides in the provision of an applied ignition system for use with a rotary piston internal combustion engine, especially of epitrochoidal construction in which the combustion process as well as the exact moment of ignition of the combustion may be accurately controlled.

Another object of the present invention resides in the provision of an external ignition system for rotary piston internal combustion engines, especially of epitrochoidal construction, in which several ignition places are provided which are so controlled externally as to match the ignition moment at the several places to the expansion velocity of the flame front.

A further object of the present invention resides in the provision of an external ignition system for use with rotary piston internal combustion engines, especially of trochoidal construction which permit an effective compensation for the continuous displacement of different parts of the fuel mixture past the ignition means within the combustion space.

These and other objects, features and advantages of the present invention will become more obvious from the following description when taken in connection with the accompanying drawing which shows schematically one embodiment in accordance with the present invention.

Referring now to the single figure of the drawing which illustrates an epitrochoidally-shaped rotary piston internal combustion engine, a substantially triangularly-shaped rotary piston 2 rolls off within the fixed housing 1 by means of an internal toothed arrangement 3 along an external toothed arrangement 4 fixed to the housing 1 in the direction of arrow 5. An eccentric disk (not illustrated) disposed within the rotary piston 2 concentrically to the internal toothed arrangement 3 transmits the circular movement of the piston axis to a drive or output shaft 6 of the engine disposed concentrically to the external toothed arrangement 4.

The inlet channel for the combustion air is designated in this figure by reference numeral 7 and the outlet channel for the exhaust gases is designated therein by reference numeral 8. The channels 7 and 8 are controlled or valved directly by the triangular edge portions of the piston 2. The fuel is injected into the combustion space by means of a nozzle 9.

Two ignition or spark plugs 10 and 11 are arranged within the internal combustion engine housing one behind the other in the direction of rotation 5 of the piston 2. The ignition plugs 10 and 11 are each connected by means of a respective electric line 12 and 13 including each an ignition coil 14 and 15 and an interrupter 16 and 17, respectively, which are adjustable with respect to the moment of interruption thereof. The interrupter cams 18 and 19 may rotate directly together with the output shaft 6 of the engine since the output shaft or drive shaft 6 rotates three times as fast as the piston 2 and three explosion strokes fall on each rotation of the piston 2.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claim.

I claim:

A rotary piston internal combustion engine, comprising housing means, polygonal rotary piston means within said housing means and defining therewith a combustion space, said housing means having an internal surface with at least two areas extending more closely to the axis thereof, inlet means near one of said two areas, several ignition plugs near the other of said two areas and disposed within said combustion space one behind the other in the direction of rotation of said piston means, a rotatable piston shaft eccentrically arranged with respect to said rotary piston, transmission means between said piston means and said piston shaft to rotate said piston means non-concentrically and relative to said piston shaft at a predetermined ratio which is greater than 1:1, said piston shaft further including first and second successively arranged ignition cams directly mounted thereon, and first and second ignition control means operatively associated with said first and second cams, respectively, for controlling said respective ignition plugs in such a manner that the respective ignition moments are different from each other, each control means including an independently adjustable interrupter in direct engagement with one of said cams and operatively connected with an ignition coil and a respective ignition plug.

References Cited by the Examiner

UNITED STATES PATENTS

| | | | |
|---|---|---|---|
| 1,132,581 | 3/1915 | Hein | 123—32 |
| 1,427,053 | 8/1922 | Bidwell | 123—8 |
| 1,575,860 | 3/1926 | Monk | 123—8 |
| 1,773,635 | 8/1930 | Simmons | 123—8 |
| 1,931,506 | 10/1933 | Newschaffer et al. | 200—21 |
| 2,306,950 | 12/1942 | Jacoby et al. | 123—32 |
| 2,412,949 | 12/1946 | Brown et al. | 123—8 |
| 2,820,856 | 1/1958 | Krueger | 200—21 |
| 2,988,065 | 1/1961 | Wankel et al. | 123—8 |

SAMUEL LEVINE, *Primary Examiner.*

RALPH H. BRAUNER, JOSEPH H. BRANSON, JR.,
*Examiners.*